Figure 3:
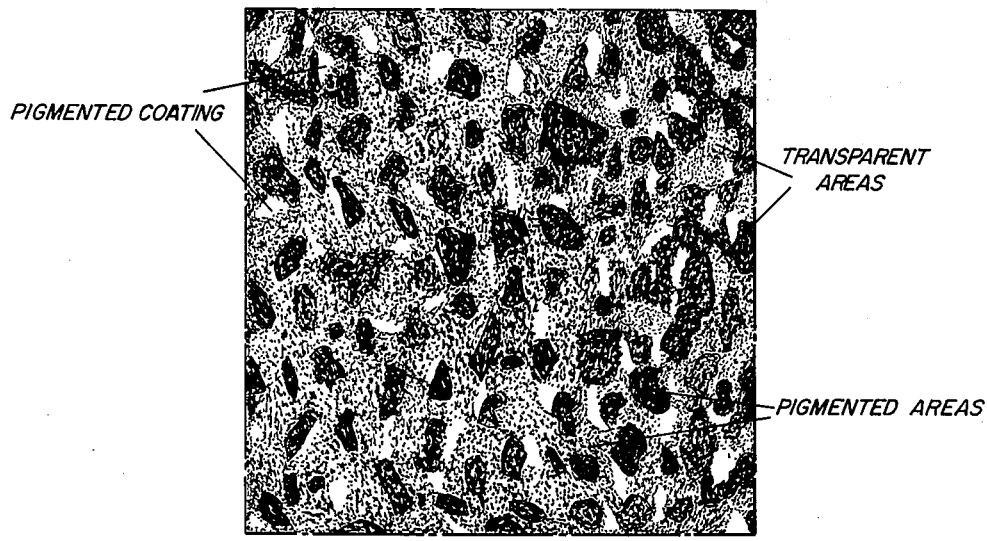

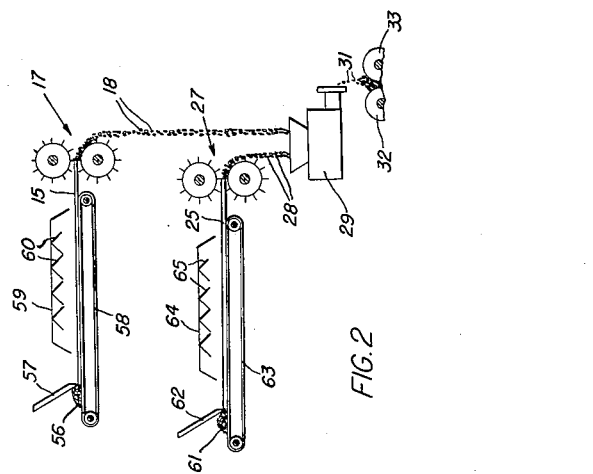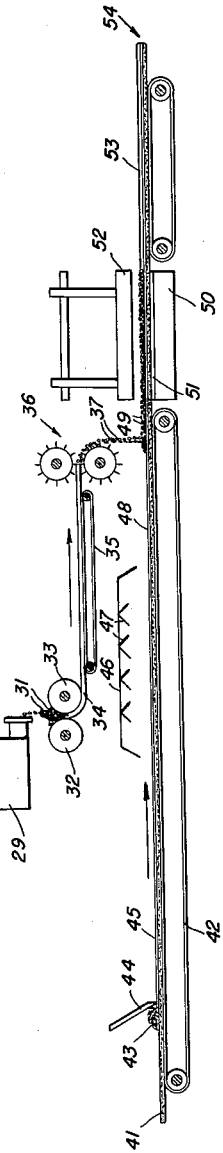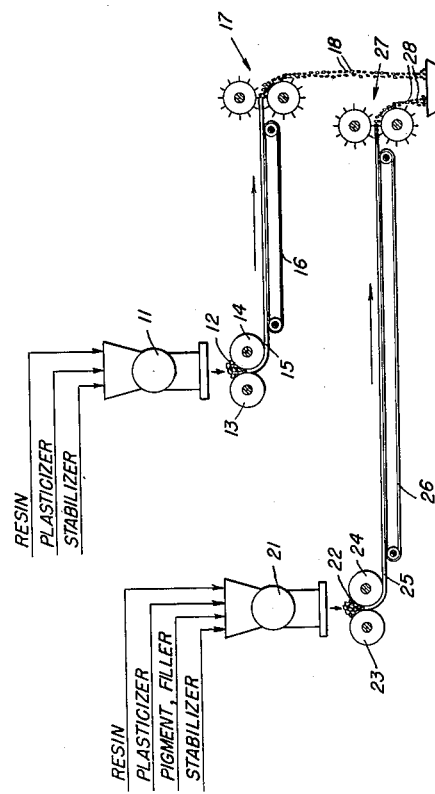

INVENTOR.
ALFRED J. HEINRICHS
BY
ATTORNEY

United States Patent Office

2,987,102
Patented June 6, 1961

2,987,102
DECORATIVE PLASTIC SURFACE COVERING
AND PROCESS THEREFOR
Alfred J. Heinrichs, Yonkers, N.Y., assignor to Congoleum-Nairn Inc., Kearny, N.J., a corporation of New York
Filed Dec. 31, 1957, Ser. No. 706,454
14 Claims. (Cl. 154—25)

This invention relates to decorative surface coverings for floors, walls and the like and in particular to plastic surface coverings which have a three-dimensional appearance and to a method of producing such plastic surface coverings.

Plastic surface coverings comprising a resinous binder, stabilizer, filler and colored pigment have come to be widely used as coverings for floors, walls and the like. These products have excellent wearing properties and resistance to attack by household chemicals. These products have been prepared in a wide range of patterns and decorations simulating most of the effects which can be produced with stone flooring materials such as marble and terrazzo. In comparison to stone floorings they have the advantage of greater resilience which renders them more comfortable under foot. In addition, they do not flake and chip when subjected to sharp impacts which is an undesirable feature of stone floorings.

Soft surface woven and textured carpeting is widely used as a covering for floors and is therefore a major source of competition to decorative plastic floor coverings. Although carpeting is soft under foot and has a desirable textured appearance, it does suffer the disadvantage of being difficult to clean. It would be desirable, therefore, to create a three-dimensional effect in a plastic surface covering which would simulate effects heretofore obtainable only in carpeting but which would have a smooth surface which could be easily cleaned. Recently plastic surface coverings having a translucent appearance have been marketed in an attempt to create such an effect. In the method now in use for producing such plastic surface coverings a batch of translucent plastic composition is formed and blended with separate batches of plastic composition pigmented in each of the colors desired in the finished product. This blend is then pressed or moulded to produce the finished product.

Plastic surface coverings so prepared have a number of significant disadvantages. First, although the product appears to be translucent when held in the hand in front of a light, there is little if any three-dimensional effect when the product is installed on the floor. An installation of such products merely resembles a modified form of a marbelized decoration which has been available for many years. Thus, the desired three-dimensional effect is not apparent in such products. Second, the translucent composition which is blended with the pigmented compositions in producing the product is formed from a blend of resinous binder and silica filler since silica has the desired optical properties to impart translucence to a vinyl resinous composition. Silica is a highly abrasive material and preparation of a composition containing silica causes rapid wear of mixing and sheet forming equipment. Third, these products are produced only in a thickness of 0.125 inch. The reason for producing the product in such a thickness is the necessity of completely eliminating the effect of visibility of the sub-floor through the finished installation. Such a thickness is not necessary for insuring adequate wear resistance and service life of the product since plastic surface coverings having a thickness well below this figure have been in satisfactory service for many years without evidence of failure. Thus, the cost of these products is high. Fourth, the installation of such products requires the use of expensive light colored resinous adhesives. Dark colored adhesives such as linoleum paste which are widely used in installing other types of floor coverings can not be used. The reason for requiring the expensive light colored adhesives is that in spite of the thickness of the product there is a possibility that the adhesive might be visible in the finished installation. Any visibility of a dark colored adhesive would mar the appearance of the installation. Fifth, the production of such products requires preparing a separate batch of pigmented plastic composition in each color desired in the finished product. This involves separate operations of mixing, sheeting and chip formation and requires the maintenance of large inventories of different colored compositions in the manufacturing plant. This large amount of processing required is expensive from the standpoint of labor and also ties up working capital in the large inventories which must be maintained. In addition, these products are produced only in the form of tiles with the result that the installation has a number of dirt catching seams.

As pointed out above these products do not have a three-dimensional effect and thus do not satisfy the requirement of producing a product which simulates carpeting. If one attempts to make such a plastic surface covering by using clear transparent composition instead of translucent composition a three-dimensional effect can be obtained. However, the product so produced is unsatisfactory because when it is installed upon a sub-floor the floor or adhesive is readily visible through the transparent areas of the product. The use of the expensive pigmented adhesives discussed above are not satisfactory to hide the sub-floor. The reason for this is that adhesives must be trowled onto a floor to form a number of closely spaced ridges of adhesive before installing a plastic floor covering. This is necessary for optimum adhesion of the finished product. By troweling the adhesive it is impossible to insure complete coverage of the floor. In fact, such complete coverage would defeat the purpose of troweling in the form of ridges. It is apparent that the presence of a transparent area in the product immediately over an uncovered or partially covered area of the sub-floor would create an undesirable appearance to the installation.

It is an object of the invention to produce a decorative plastic surface covering which can be installed upon a surface such as floors, walls and the like to create a three-dimensional effect. A further object of the invention is to produce a plastic surface covering having a three-dimensional effect with a wearing surface having a thickness substantially less than 0.125 inch. A still further object of the invention is to produce a plastic surface covering having a three-dimensional effect by a method wherein inventories of plastic composition chips are not required for all the colors in the product. Another object of the invention is to produce a plastic surface covering having a three-dimensional appearance which can be installed using inexpensive, dark adhesives such as linoleum paste. An additional object of the invention is to provide a plastic surface covering having a three-dimensional effect which can be installed without regard to the character and appearance of the sub-floor. A still further object of the invention is to provide a plastic surface covering having a three-dimensional effect in the form of wide sheets permitting installation of the product with a minimum of dirt catching seams. Other objects and the advantages of the invention will appear hereinafter.

In accordance with the invention a decorative plastic surface covering is produced by forming a plastic sheet having a major portion of pigmented opaque areas and a minor portion of transparent light-transmitting areas upon a backing material having a pigmented surface layer of compatible composition, the pigmented layer being visible through the light-transmitting areas to create a three-dimensional effect in the product.

The pigmented layer upon which the decorative sheet of pigmented and transparent areas is formed is normally formed upon a surface of a sheet of strong backing material. Strength is important in order that the product withstand the strains occurring both during manufacture and installation. In the case of a flexible resilient product useful as a floor covering, the backing should also have sufficient flexibility to permit the product to be rolled and unrolled without cracking or tearing. Suitable backing sheets include those formed of resinous compositions as well as sheets of impregnated felted fibers. Any of the theremoplastic or elastomeric resinous compositions which can be calendered or pressed to form a flexible sheet can be used to form backing sheets for use in the invention. Such resins as butadiene-styrene copolymer, polymerized chloroprene, polyvinyl chloride, polyvinyl acetate, vinyl chloride-vinyl acetate copolymer and the like can be compounded with plasticizers and fillers and sheeted to form a flexible sheet. In some cases, scrap and degraded resinous compositions can be salvaged by forming them into sheets which are useful as backing sheets in producing products in accordance with the invention.

Suitable backing sheets also include woven fabrics such as burlap and those formed from cotton, wool and various synthetic fibers. It has been found that felted cellulose fibrous sheets impregnated with a water-proofing and strengthening saturant are highly desirable backings for products prepared in accordance with the invention since they are low in cost and yet are flexible and strong. Numerous fibrous materials can be used in preparing a fibrous backing for use in the invention. In addition to cellulase, other types of fibers can be used including those of animal and mineral origin. The sources of cellulose can include cotton or other rags, wood pulp, paper boxes or mixtures thereof in any proportion. In addition, fillers such as wood flour can be used. A slurry of fibrous material in water is formed into a sheet using any of the techniques conventionally employed in the manufacture of paper. For example, sheet formulation can take place on a Fourdrinier or cylinder paper machine. The fibrous sheet so prepared is then dried.

Felted fibrous sheets for use as backings for surface covering products are normally impregnated with a water-proofing and strengthening impregnant in order to impart improved strength and water resistance to the sheet.

The particular impregnant must not only be able to impart strength and water resistance to a sheet of felted fibers but must also have certain desirable high temperature properties. In accordance with the invention the decorative composition sheet having pigmented and transparent areas is formed on the backing under high pressure and temperatures as high as about 350° F. Thus the particular impregnant chosen must be physically and chemically stable at these temperatures. It should be free of any volatile components and also it must not soften to such an extent as to exude from the sheet. In addition, the saturant should not be subject to any detrimental chemical changes at these high temperatures such as oxidation.

Felted fibrous sheets impregnated with asphalt have been used for many years in the production of surface coverings. Asphalt has the desirable features of being low in cost and of imparting good water resistance to a felt sheet. However, asphalt is a highly thermoplastic material and tends to become soft at temperatures only slightly above normal in the atmospheric temperatures. Thus, in general asphalt is a less satisfactory impregnant for felted fibrous backing sheets useful in the invention. Fibrous sheets impregnated with resinous materials are particularly suitable for use as backing sheets in the invention. Suitable resins include vinyl resins, such as polyvinyl chloride, polyvinyl acetate, polymerized vinylidene chloride, mixtures of these with each other, copolymers with each other and with other monomers copolymerizable therewith, polymerized acrylic and methacrylic acids and their polymerized derivatives, polyethylene, polystyrene, butadiene-styrene copolymer, butadiene-acrylonitrile copolymer, natural rubber, polymerized chloroprene and the like. Thermosetting resins which under the influence of heat cure by polymerizing and cross linking can also be used as impregnants. Such resins as phenolic resins, polyesters, oleoresins such as drying oils and the like, isocyanates and polyurethanes and the like are suitable.

Such resins can be incorporated into a felted fibrous sheet by impregnation of the finished sheet with an emulsion or solution of the resin followed by drying of the sheet to remove the solvent. Alternately, the resin can be added in fine particles to the fiber furnish prior to sheet formation either as solid particles of resin or as an emulsion in water from which fine particles of resin are precipitated onto the fibers.

In accordance with the invention a surface of the backing on which the decorative sheet is formed is provided with a pigmented layer. This layer can be of any color depending on the particular effect desired in the finished product. It has been found particularly effective from the standpoint of cost and ease of application that the pigmented layer be formed on the backing by coating technique. The coating composition comprises a resinous binder, pigment, filler and stabilizer in a liquid dispersion medium. An aqueous system has been found particularly effective. In the coating composition, the ratio of resinous binder to pigment and filler is in the range of about 1:4 to 1.5:1.

The resinous binder used in the coating composition must be one that can be coalesced, fused or cured into a continuous film by the application of heat thereby forming the pigmented layer upon the backing. The resinous binder in the coating composition must be compatible with the decorative sheet having pigmented and transparent areas formed upon the decorative layer as described more fully hereinafter. The method of the invention is adapted to the preparation of both flexible and rigid decorative sheets, but a flexible product is most desirable for use as a resilient surface covering for floors. The preferred resinous binder in the coating composition comprises thermoplastic resinous material since thermoplastic resins are particularly suited to the production of flexible resilient sheets. The thermoplastic resinous binder can be made up solely of thermoplastic resinous material but it normally comprises a mixture of a thermoplastic resin and plasticizer.

Useful thermoplastic resins include polymers and copolymers of acrylic and methacrylic acids and their derivatives, the vinyl resins, polystyrene, polymerized methylstyrene, polybutadiene and the like. Polymers of vinyl chloride have been found particularly effective in the formulation of coating emulsions in the invention. The vinyl chloride polymers can either be simple, unmixed homopolymers of vinyl chloride or copolymers thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of another monomer is copolymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like.

As already discussed, thermoplastic resinous material can be produced which has satisfactory flexibility at normal temperatures without the presence of plasticizer to be useful as the resinous binder in the coating composition. However, in the case of most of the preferred vinyl chloride polymers, the presence of plasticizer is desirable. Useful plasticizers are esters of straight and branched chain alcohols with aliphatic acids, esters of aliphatic alcohols and aromatic acids, esters of aromatic alcohols and aliphatic acids, esters of aromatic alcohols and aromatic acids, organic esters of inorganic acids, high molecular weight hydrocarbon condensates and the like. Typical plasticizers of these types include dibutyl sebacate, dioctyl sebacate, dioctyl adipate, dioctyl azelate, triethylene glycol di-(2-ethylhexanoate), diethylene glycol dipelargonate, dibutyl phthalate, dioctyl phthalate, dibutoxy ethyl phthalate, dipropylene glycol dibenzoate, butyl benzyl phthalate, dibenzyl sebacate, dibenzyl phthalate, tricresyl phosphate, octyl diphenyl phosphate, chlorinated paraffine, alkyd derivatives of rosin and the like. The blend of resin and plasticizer is normally formed within the limits of 15 to 150 parts of plasticizer per 100 parts of resin.

Elastomeric resins such as butadiene-styrene copolymer, butadiene-acrylonitrile copolymer, polymerized chloroprene, natural rubber and the like can also be used as resinous binders in the formulation of coatings for use in the invention. Thermosetting resins can also be used as resinous binders in the coating composition, such as urea-formaldehyde resins, melamine resins, polyesters and the like. The use of coating compositions containing thermosetting resins is restricted to the situation where the decorative composition formed into a sheet upon the pigmented layer is also thermosetting, the resulting final product after cure being a rigid sheet. When a thermosetting resin is used as the resinous binder in the coating composition, the resin should be in an uncured or partially cured state.

The coating composition also contains fillers and pigments in accordance with the particular background color desired in the finished product. Inert fillers such as silica, both amorphous and crystalline, whiting, talc, clay, pumice, limestone and the like are suitable. Pigments are selected in accordance with the desired color. For example, where a white background is desired titanium dioxide and zinc oxide either alone or with extenders such as barium sulfate, calcium sulfate, magnesium carbonate, magnesium silicate and the like can be used. For colored background coatings any of the well known organic or inorganic pigments can be used in the coating emulsion. In the production of the coating composition in the form of an emulsion the pigments and fillers are normally ground with water in the presence of wetting agents, thickening agents and the like and the resulting dispersion is mixed with a previously formed emulsion of resinous binder. Formulation is simplified by the fact that emulsions of resinous binders are commercially available and are readily pigmented and filled to form suitable coating emulsions for use in the invention.

The coating composition also contains stabilizers to minimize degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium and the like, glycerine, leucine, alanine, o- and p-amino benzoic and sulfanilic acids, hexamethylene tetramine, weak acid radicals including oleates, recinoleates, abietates, salicylates and the like. Normally, the composition contains from 0.5 to 5 parts stabilizer per 100 parts resin.

When the coating composition is formulated as an aqueous emulsion, the dispersion is formed in the conventional manner and with conventional ingredients well known in the latex art. The coating emulsion in general contains about 40 to about 65 percent solids with the balance being water. In addition to the resinous binder, pigment, filler and stabilizer, the emulsion contains conventional wetting agents, thickening agents, antifoam agents, sequestering agents and alkali. Suitable wetting agents include the sodium salt of alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable antifoam agents are pine oils, silicone antifoam agents such as are manufactured by the Dow-Corning Company, Midland, Michigan, diglycol laurate, and octyl alcohol. Suitable sequestering agents include tetrasodium pyrophosphate and the tetrasodium salt of ethylenediamine tetra-acetic acid. The alkali provides a pH of above 7.0 so that there will be no tendency for the latex to coagulate. Calcium hydroxide, ammonia, and potassium hydroxide are suitable alkalies for this purpose.

The use of a highly pigmented and filled emulsion of resinous binder and plasticizer is preferred but the coating can be applied from different types of liquid compositions. For example, thermoplastic resinous plastisol and organosol coating systems can be used. In this case the dispersion medium instead of being water is a plasticizer for the resinous binder in the case of a plastisol and a mixture of plasticizer and volatile organic solvent in the case of an organosol. Since it is desired to obtain a thin dense layer which completely covers and hides the backing, a dispersion containing high percentages of pigment and filler is particularly desirable. For this reason the aqueous emulsion system is preferred since plastisols and organosols can not be highly filled without attaining such a high viscosity that coating becomes difficult. Although coating is preferred, since in this way a thin uniform layer can be applied to the backing at minimum cost, the pigmented layer can also be applied as a thin resinous composition sheet formed by calendering or other techniques of sheet formation. In this case the pigmented composition sheet must be bonded to the backing by means of a suitable adhesive. Where resinous compositions in sheet form are used as backings the composition can be pigmented so that the surface upon which the decorative sheet having light transmitting areas is formed has the desired color. This eliminates the necessity of a separate coating step. However, this technique is normally not desirable from a cost standpoint since the entire backing must be pigmented when only the appearance of the surface is important. Thus this particular technique is wasteful of expensive pigments.

When using the preferred technique of coating to apply a pigmented layer to a surface of the backing, the resinous composition is applied to the backing by any of the conventional techniques well known in the coating art such as roller coating, doctor blade coating, spray application, brush application and the like. After the coating has been applied to the backing the sheet must be subjected to heat in order to evaporate any volatile components and to set the resinous binder into a flexible uniform film. In the case of the preferred aqueous latex emulsion coating system the heat treatment step serves to evaporate water in the emulsion. The temperature which the coated layer must attain is dependent on the particular resinous binder used. With the preferred thermoplastic resinous binders, the coating is preferably heated to the fusion temperature of the resin, that is the temperature at which the resin becomes solvated by plasticizer to yield a smooth flexible tough film. Where the thermoplastic resinous binder contains no plasticizer, the coating is heated to a temperature sufficient to soften the resin, thereby causing the minute particles present in the emulsion to coalesce and form a uniform film. Heating to a temperature within the range of about 250° to about 350° F. is sufficient to evaporate the water present in the emulsion and to yield a uniform film. A similar heat treatment step is carried out when an elastomeric resinous coating composition is applied to a surface of the backing to yield a pigmented layer thereon. Where the thermosetting resinous binders are used in the coating emulsion, the temperature to which the coating is subjected must be sufficient to evaporate all the water in the emulsion but insufficient to completely cure the resin. Heating can be effected by passing the sheet through a forced hot air oven or radiant heating elements can be placed above the coated surface.

In accordance with the invention a partially transparent layer of decorative and wear resisting composition is formed into a sheet on the pigmented layer. Since the wearing surface of the product is partially transparent the pigmented layer is at least partially visible which creates a three-dimensional effect in the finished product. This effect is created by use of a blend of clear transparent resinous composition and pigmented opaque resinous composition. The two compositions are formulated separately, then are blended and finally are formed into a sheet on the pigmented layer by the application of heat and pressure. The blend should contain about 40 percent to about 90 percent clear and about 60 percent to about 10 percent opaque compositions by weight. A range of 50 percent to 80 percent clear and 50 percent to 20 percent opaque compositions by weight is particularly effective.

The clear transparent and pigmented opaque resinous composition can be deposited as clear and opaque chips upon the pigmented layer. Preferably, however, the compositions are first blended and sheeted to form an irregular sheet comprising clear and opaque areas. This irregular sheet is then cut into chips which are deposited on the pigmented layer and formed into a sheet thereon to form a decorative wearing surface layer having pigmented opaque and transparent light transmitting areas through which the pigmented layer is irregularly visible to create a three-dimensional effect. The proportion of the decorative wearing surface layer which is represented by transparent light transmitting areas extending completely through the thickness thereof permitting visibility of the pigmented layer is influenced by several factors. First, it is influenced by the relative proportions of clear and pigmented compositions used in forming the chips which are deposited upon the pigmented layer. The preferred range of proportions has been disclosed hereinabove. Second, in the case of the preferred embodiment of the invention where the clear and pigmented compositions are first blended and sheeted to form an irregular sheet which is then cut into chips and deposited on the pigmented layer, the degree of mixing of the compositions in the initial sheet forming will control the relative proportions of clear to pigmented areas in the finished product. If clear and pigmented compositions are thoroughly blended to form a homogeneous mass, the pigment will become completely dispersed throughout the entire composition, thus completely masking the clear composition and rendering the creation of the desired three-dimensional effect impossible. Thus, the degree of mixing or blending of the compositions must be controlled. It is desirable that the pigmented composition be broken up and irregularly dispersed into the clear composition but the degree of mixing be controlled so as to leave appreciable proportions of clear areas in the irregular sheet. Third, the proportions of clear to pigmented areas in the finished product is controlled by the relation between thickness of the chips deposited on the pigmented layer to the thickness of the decorative wearing surface layer which is formed from the chips. Where the chips are comparatively thin as compared to the thickness of the decorative wearing surface layer to be formed therefrom, many of the clear light transmitting areas in each chip become masked by pigmented opaque areas in other chips which are pressed either above or below the chip in question. Thus, where a large number of chips are piled one above another, the chance of a clear light transmitting path extending completely through to the pigmented layer is greatly reduced. It is desirable, however, in order to obtain a good degree of consolidation of the chips into a uniform integral layer without the presence of voids or weak areas, that the chips be thinner than the thickness of the decorative wearing surface layer formed therefrom. The thickness of the chips should be from about ⅛ to about ⅔ of the thickness of the decorative wearing surface layer and a chip thickness in the range of ¼ to ½ the decorative wearing surface thickness is particularly effective. In view of the considerations mentioned above it is apparent that the relative proportions of clear light transmitting areas which extend completely through the decorative wearing surface layer as compared to the pigmented opaque areas which hide the pigmented layer from view will be appreciably less than the proportions of clear to pigmented compositions blended to form the decorative wearing surface layer. These clear light transmitting areas which extend completely through the thickness of the decorative wearing surface will normally represent less than 50 percent of the surface area of the product and preferably will be in the range of 5 percent to 30 percent of the surface area of the product. It is apparent, therefore, that the decorative effect created by products produced in accordance with the invention is largely created by the pigmented areas in the product with the effect of dimension being created by the minor proportion of light transmitting areas which permit visibility of the pigmented layer.

The blend of clear and pigmented compositions is formed into a sheet upon the pigmented layer by heat and pressure. It is a significant feature of the invention that an adhesive is not required to bond the decorative wearing surface layer comprising clear light transmitting areas and pigmented opaque areas onto the pigmented layer. This result is obtained by selecting clear and opaque compositions that are compatible with the resinous binder in the pigmented layer.

The clear and opaque compositions comprise a resinous binder and stabilizer and in addition in the opaque composition, pigment and filler. As disclosed above, a resinous binder containing a vinyl chloride polymer is particularly effective in formulating the coating composition used in forming the pigmented layer upon a surface of the backing. Thus, the use of vinyl chloride polymer compositions for the clear and opaque compositions is particularly effective to insure optimum adhesion between the decorative translucent wearing surface and the pigmented layer thereby promoting excellent resistance to delamination. The resulting product is flexible and resilient which renders it highly desirable as a floor covering. Any of the vinyl chloride polymers disclosed above in connection with description of the coating composition can be used in the clear and opaque compositions, that is homopolymers of vinyl chloride and copolymers thereof. Vinyl chloride polymer compositions useful as clear and opaque compositions in the invention contain as the resinous binder a blend of vinyl chloride polymer and plasticizer. Any of the plasticizers disclosed above in the discussion of the coating composition can be used. There normally are from 15 to 150 parts plasticizer per 100 parts vinyl chloride polymer.

Although a vinyl chloride polymer binder is particularly effective in the clear and opaque compositions for use in the invention, these compositions can also be formed from other thermoplastic resins as well as rubbery elastomeric and thermosetting resins, such as disclosed above in the discussion of the coating composition. The resinous system selected for the clear and opaque compositions should be compatible with the resin in the pigmented layer to insure maximum adhesion between the pigmented layer and the decorative translucent wear layer. In addition, the resin selected should be capable of being formulated into a clear transparent composition. For example, when the pigmented layer is formed of a thermosetting resinous composition, the clear and opaque compositions should also be of the thermosetting resinous type, with the particular resin selected being compatible with the composition of the pigmented layer.

The compositions can also contain small amounts of a release additive in order that the product can be more easily removed from the surface against which the decorative composition is moulded to form a smooth uniform sheet. Suitable release additives are waxy substances of both synthetic and natural origin with the vegetable waxes such as carnauba wax being particularly effective. Where a release additive is used the composition normally will contain from 0.2 to 5 parts of release additives per 100 parts resin. The compositions also contain stabilizers to minimize degradation by light and heat, such as disclosed above in the description of the coating composition.

The clear transparent composition contains resinous binder, stabilizer and a release additive, if desired. It is not highly pigmented and filled. Color can be imparted to the clear composition by the use of small amounts of pigment or organic dye, but the amount used must not be sufficient to impart any appreciable degree of opacity to the composition. The opaque composition differs from the clear composition in that it comprises pigment in an amount sufficient to render the composition opaque. The opaque composition also preferably contains filler in order to reduce the cost of the composition. The opaque composition can contain up to about 80 percent by weight pigment and filler. Pigment is used in order to impart the desired color and opacity to the composition and can be any of the well known organic or inorganic pigments widely used in the plastic surface covering industry. The opaque composition can also contain inert fillers such as whiting, clay, talc, pumice, limestone and the like.

A blend of clear and opaque compositions is deposited in the form of chips upon the pigmented layer and formed into a sheet thereon by heat and pressure. The size of the chips can range in face area from about 0.05 inch in diameter to about 1.5 inches in diameter. The thickness of the chips has been disclosed hereinabove and is preferably from about 1/6 to about 2/3 of the thickness of the translucent decorative wearing surface created by the sheet forming step. A chip thickness in the range of 1/4 to 1/2 the translucent wearing surface thickness is particularly effective. The thickness of the translucent wearing surface of the product is normally in the range of about 0.015 to about 0.050 inch.

Figure 4:
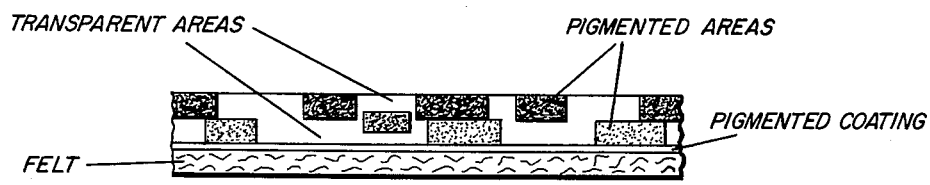

The invention will be described with reference to the drawing wherein FIGURE 1 is a schematic representation illustrating one embodiment of the method of producing a decorative plastic surface covering in accordance with the invention, FIGURE 2 shows a modification of the method illustrated in FIGURE 1, FIGURE 3 is a face view of a floor covering prepared according to the invention illustrating one of the forms of pattern effect which can be achieved, and FIGURE 4 is a cross-section of a floor covering prepared according to the invention such as shown in FIGURE 3.

With reference to FIGURE 1, a supply of resin, plasticizer and stabilizer is added to a Banbury mixer 11 which is operated at a temperature of 350° F. and in which the ingredients are intimately mixed and blended and the resin becomes fused and solvated by the plasticizer. The fused composition 12 drops from the Banbury mixer into the nip between a pair of heated rotating calender rolls 13, 14 from which a clear sheet of plastic composition is withdrawn. The sheet is carried by a conveyor belt 16 into a rotary cutting unit 17 in which the sheet is cut into a plurality of chips 18.

A supply of resin, plasticizer, stabilizer, pigment and filler is fed to a second Banbury mixer 21 operated at a temperature of 350° F. The ingredients are thoroughly and intimately blended in the Banbury mixer and the resin becomes fused and solvated by the plasticizer. The fused composition 22 drops from the second Banbury mixer into the nip between a pair of heated rotating calender rolls 23, 24 between which a pigmented opaque plastic composition sheet 25 is formed. The sheet is carried by a conveyor belt 26 into a second rotary cutting unit 27 wherein the sheet is cut into a plurality of chips 28.

The clear chips 18 and the pigmented opaque chips 28 drop into a tumbling mixer 29. From the mixer is withdrawn a uniform blend of chips 31 which fall into the nip between a pair of heated rotating calender rolls 32, 33. A sheet 34 having opaque areas and clear light transmitting areas is produced between the calender rolls and the sheet is carried by a conveyor belt 35 into a third rotary cutting unit 36 in which the sheet is cut to form a plurality of chips 37.

A sheet of impregnated felted cellulose fibers 41 passes onto and is carried by a conveyor belt 42. A mass of liquid pigmented resinous composition 43 is doctored by a doctor blade 44 to provide a thin uniform coating 45 on the upper surface of the felted fibrous sheet. The coating is dried by passing beneath an oven 46 which bears a plurality of radiant heating units 47 thereby forming a dried pigmented layer 48 upon the felt. The chips 37 fall upon the pigmented layer to form a layer of chips 49. The sheet is passed beneath a flat bed press formed of a base 50 and a resilient layer 51 upon which the felted fibrous sheet rests and an upper heated pressing surface 52. In the press the layer of chips is formed into a smooth decorative layer 53 having opaque areas and clear light transmitting areas through which the pigmented layer 48 is visible to create a three-dimensional effect. The product 54 is withdrawn from the press and can be used as a decorative surface covering as produced or can be cut into standard square or rectangular pieces or other shapes if desired.

FIGURE 2 illustrates an alternate method of forming clear and opaque compositions into sheets which can then be cut into chips, blended, and the blend used in the method illustrated in FIGURE 1. A mass of clear thermoplastic resinous composition 56 in the form of a fluid plastisol or organosol is cast by means of a doctor blade 57 onto a smooth metal belt 58. The belt carries the thin clear layer beneath a heating oven 59 provided with a plurality of radiant heating elements 60 to yield a clear fused thermoplastic resinous composition sheet 15. The sheet is cut by cutting unit 17 into clear chips 18 as already described in connection with FIGURE 1. A mass of pigmented opaque thermoplastic resinous composition 61 formulated as a fluid plastisol or organosol is cast by means of a doctor blade 62 onto a smooth metal belt 63. The thin layer of pigmented composition is carried by the belt beneath an oven 64 provided with a plurality of radiant heating elements 65 to yield a pigmented fused thermoplastic resinous sheet 25. The sheet is cut by the cutting unit 27 into pigmented chips 28 as already disclosed in connection with FIGURE 1. The clear and opaque chips are then blended and sheeted between calender rolls 32, 33 to form a sheet which is then processed in the manner illustrated in FIGURE 1.

In operation the felted fibrous sheet is passed in stepwise fashion driven by the intermittent operation of the conveyor belt 42. Each stepwise advance is equal in length to the length of the flat bed press. When the sheet is in motion the rotary coating unit 36 is operated to lay down a metered amount of translucent chips upon the pigmented layer. The operation of the cutting unit is then stopped and the upper pressing surface 52 comes down to consolidate the chips into a smooth and uniform layer. At the end of the pressing cycle the pressing surface is raised and the cycle is repeated.

The pressing surface 52 can be coated with a press release agent such as a waxy material, a silicone and the like in order that the hot pressing surface can release from the resinous composition sheet at the end of the pressing cycle without the composition sticking to the pressing surface. Alternately, a sheet of paper or other fibrous material impregnated with a releasing agent can be interposed between the pressing surface and the granules during the pressing cycle. Release can also be facilitated by cooling the pressing surface prior to raising it from the consolidated resinous composition. Although the drawing shows the use of a flat bed press in consolidating the composition into a smooth uniform sheet, it is also possible to carry out the consolidation in other means such as in a rotary press or between closely spaced calender rolls.

The embodiment shown in FIGURE 2 for the preparation of the clear and opaque chips is particularly advantageous in the preparation of a flexible product having a decorative thermoplastic resinous composition wearing surface layer. Flexible thermoplastic resinous products are commonly produced in the industry by forming the composition in Banbury mixers. Banbury mixers are large and expensive pieces of equipment and consume large amounts of power. Thus their use is mainly restricted to operations where a large volume of product is to be produced. The embodiment illustrated in FIGURE 2 is adaptable to manufacturing plants which do not have Banbury mixers or where the cost of such equipment would be prohibitive in view of the volume of product to be produced. Plastisol and organosol compositions can be prepared as both clear transparent compositions and also as pigmented opaque compositions. In plastisols and organosols the thermoplastic resin, such as polyvinyl chloride, is dispersed in the form of discrete unplasticized particles in a liquid dispersion medium. In the case of a plastisol the dispersion medium is a plasticizer for the resin. In an organosol the dispersion medium is a mixture of plasticizer for the resin and a compatible, volatile, organic solvent. Both plastisols and organosols can be prepared in a wide range of viscosities adaptable to any of the conventional methods of coating. After a fluid plastisol or organosol film has been cast the film is subjected to heat in order to fuse and solvate the resin in the plasticizer and to evaporate any volatile diluent in the case of an organosol. The resulting fused film is tough and flexible and can readily be cut into chips for use in the invention. The ultimate wearing properties of products produced in accordance with the invention are the same whether the clear and opaque compositions are cast from fluid plastisol or organosol compositions as illustrated in FIGURE 2, or are fused in Banbury mixers as shown in FIGURE 1.

In the embodiments of the invention illustrated in the drawing, separate batches of clear and pigmented opaque composition are sheeted, cut into chips and then a uniform blend of the chips is again sheeted and cut to form irregularly translucent chips which are pressed onto the pigmented layer to produce the finished product. As an alternate procedure it is possible to press the blend of opaque and clear chips directly onto the pigmented layer of the backing, thus leaving out the intermediate step of sheeting and rechipping the blend. In this alternate procedure the appearance of the finished product is somewhat different from that of the product produced by the embodiment illustrated in the drawing since the clear and pigmented opaque compositions are not so thoroughly intermingled in the decorative wearing surface layer of the product. The product produced by this alternate procedure described above has pigmented areas and sharply defined clear transparent areas through which the pigmented layer is visible.

As a further modification of the invention it is possible to form a supply of pigmented opaque resinous composition chips in the manner shown in the drawing and then to add these chips to a mass of hot plasticized resinous binder in a mixing device. The mixing is carried out for a sufficient length of time to thoroughly incorporate the pigmented opaque chips into the mass of clear plasticized resinous binder and to soften the chips somewhat but not for a sufficient time to form a homogeneous mixture. The resulting mixture can be sheeted and cut into chips which can then be deposited upon the pigmented layer of the backing and consolidated to yield a product with a decorative wearing surface layer having opaque and clear light transmitting areas. This latter modification can also be carried out in the opposite way, that is clear chips can be mixed with a mass of pigmented opaque resinous composition and the resulting mixture can be sheeted, chipped and consolidated onto the pigmented layer.

As a still further modification of the invention it is possible to form the decorative wearing surface of the product from a blend of clear and/or opaque composition chips with chips which each have opaque and clear areas therein. Thus, with reference to FIGURE 1 the layer 49 of chips applied to the pigmented layer of the backing prior to the pressing operation can ultimately be a mixture of the chips 37 which have clear and opaque areas and clear chips 18 or a mixture of chips 37 and opaque chips 28. In either case the essential characteristic of the product in having opaque areas and clear light transmitting areas through which the pigmented layer is visible, is unchanged. It is apparent, however, that there are a wide range of decorative effects, all of which fall within the scope of the invention which can be produced through use of the various modifications or combinations thereof as disclosed hereinabove.

Where a flexible product having a decorative thermoplastic resinous composition layer is produced, the clear and opaque compositions can alternately be formulated as plastigel compositions. In one form of plastigel the major portion of the resin is unfused and unsolvated by the plasticizer and dispersed as discrete unplasticized particles throughout the composition. The composition is given sufficient strength to withstand feeding, chipping and handling by having a minor proportion of the binder as fused resin. In a second type of plastigel all the resinous binder is unfused and strength is imparted to the composition by the use of small amounts of a gelling agent. When a plastigel composition is used in the production of products in accordance with the invention, the composition is formed into chips and they are deposited on the pigmented layer of the backing in accordance with any of the embodiments described above. The unfused chips are then consolidated by heat or pressure either in a press or between calender rolls and then the sheet is subjected to heat in order to fuse the composition. When a plastigel composition is used, lubricants can be incorporated into the composition to permit release from the hot pressing surface without sticking of the composition thereto.

The processing conditions will, of course, vary depending on the particular type of resinous material used. Those skilled in the art of processing resins will be able to select the proper temperatures required to yield a tough and durable product. In the case of thermoplastic resins, the composition must become fused. As outlined above in the discussion of the different embodiments of the invention, fusion of the compositions making up the decorative wearing surface of the product can occur either during initial mixing of the clear and opaque compositions or after formation of the compositions into a sheet. When thermosetting resinous binders are used to form the pigmented layer and the clear and opaque compositions, the product after formation of the decorative wearing surface must be subjected to heat for a time sufficient to cure the thermosetting resins used.

Products produced in accordance with the invention have a smooth and durable wearing surface integrally and firmly bonded to a backing with excellent resistance to delamination. The decorative wearing surface of the product has irregular transparent areas through which the pigmented layer formed on the backing is visible. This imparts a three-dimensional character to the decorative effect. In the preferred embodiments of the invention where the clear and opaque compositions are blended and then formed into translucent chips, the three-dimensional character of the effect is enhanced since the pigmented opaque areas are disposed throughout the thickness of the decorative wearing surface, frequently as streaks of color extending into the decorative wearing surface at an angle thereto. This feature insures that the character of the decoration is preserved as the product wears after installation. The decorative effect in the product is random since the pigmented streaks are disposed at angles to each other due to the random distribution of chips upon the backing prior to the pressing operation. The pigmented streaks are separated by light transmitting areas through which portions of the pigmented layer are visible. Thus, the color or colors used in the pigmented layer on the backing form part of the color characteristics of the finished product. Accordingly, the method of the invention permits the production of a product wherein a portion of its color characteristics are produced by inexpensive coating techniques. The thickness of the decorative wearing surface, that is from about 0.015 to about 0.050 inch, is appreciably less than the 0.125 inch thickness in which translucent plastic products have been available in the past. This permits the manufacture and sale of a product bearing such a decorative effect at a considerably lower cost than heretofore possible. Where the decorative wearing surface is formed of a preferred thermoplastic resinous composition, the product is resilient and flexible and appreciably softer and quieter under foot than marble or stone floorings. The product can be produced in wide sheets for installation with a minimum of seams and can be installed using inexpensive dark colored adhesives such as linoleum paste.

The following example is given for purposes of illustration:

*Example*

A coating emulsion having the following composition was prepared:

| | Parts (dry) |
|---|---|
| Geon 576[1] latex (54% solids) | 42 |
| Titanium dioxide dispersion (60% solids) | 15 |
| Calcium carbonate dispersion (60% solids) | 43 |
| | 100 |

[1] Pre-plasticized polyvinyl chloride copolymer in latex form, B. F. Goodrich Chemical Co., Cleveland, Ohio.

This emulsion was applied by a reverse roller coater to a surface of a sheet of felted cellulose fibers which was impregnated with a mixture of polyvinyl acetate and a petroleum resin having a softening point of 125° F. The coated sheet was dried by exposure to a temperature of 275° F. for 5 minutes to yield a sheet bearing a white pigmented layer upon a surface thereof.

The following composition was mixed and fused in a Banbury mixer at 350 F.:

| | Parts | Percent by Weight |
|---|---|---|
| Polyvinyl chloride | 100 | 72.7 |
| Dioctyl phthalate | 33 | 24.0 |
| Stabilizers | 4 | 3.0 |
| Carnauba wax | 0.4 | 0.3 |
| | | 100.0 |

The composition while hot was sheeted between calender rolls to yield a clear, transparent sheet. The sheet was cooled by exposure to the atmosphere and then was comminuted into chips.

The following composition was fused and mixed in a Banbury mixer at 350° F.:

| | Parts | Percent by Weight |
|---|---|---|
| Polyvinyl chloride | 100 | 30.9 |
| Dioctyl phthalate | 15 | 4.6 |
| Dipropylene glycol dibenzoate | 18 | 5.6 |
| Calcium Carbonate | 177 | 54.8 |
| Titanium Dioxide | 9 | 2.8 |
| Red Pigment | 1 | 0.3 |
| Stabilizers | 3 | 0.9 |
| Carnauba Wax | 0.3 | 0.1 |
| | | 100.0 |

This composition while hot was sheeted between calender rolls to yield a pink opaque sheet. The sheet was cooled by exposure to the atmosphere and then was comminuted into chips.

The clear and pink chips were uniformly blended in the proportions of 80 percent by weight clear and 20 percent by weight pink. This blend was heated and calendered into a sheet having a thickness of 0.015 inch. The sheet was cooled by exposure to the atmosphere and comminuted into chips having a thickness of 0.015 inch and ranging in face area from ¼ inch square to 1 inch square.

These chips were uniformly deposited upon the pigmented layer on the surface of the impregnated felt sheet. The chips were consolidated at a pressure of 1000 pounds per square inch in a flat bed press, the pressing surface being maintained at a temperature of 330° F. to yield a decorative wearing surface with a thickness of 0.040 inch integrally bonded to said pigmented layer. The pressing surface was coated with a thin layer of silicone release fluid before each pressing cycle. The product was removed from the press, cooled by exposure to the atmosphere and was rolled up for storage.

The decorative wearing surface layer of the product is integrally bonded to the pigmented layer with excellent resistance to delamination. The decorative layer has a plurality of pigmented pink streaks disposed at angles to each other and extending into the thickness of the decorative layer at angles to the surface. The streaks are separated by irregular light transmitting areas through which portions of the pigmented layer applied to the backing are visible. About 15 percent of the surface of the decorative layer presents clear light transmitting paths which extend completely through the thickness of the decorative layer, thereby rendering about 15 percent of the area of the pigmented layer visible to create a three-dimensional effect. Since the pigmented streaks are disposed throughout the thickness of the decorative wearing surface layer, the character of the decorative effect is preserved throughout the useful life of the product during wear after installation.

Any departure from the above description which conforms to the present invention is intended to be included within the scope of the claims.

What is claimed is:

1. A method of producing a decorative surface covering having a wear layer with three dimensional appearance which comprises pressing a blend of about 40 to about 90% of transparent chips and about 60 to about 10% opaque chips of resinous compositions upon a backing having a surface formed of a colored pigmented resinous composition compatible with said chips thereby forming a smooth decorative wear layer of substantial thickness upon said surface layer, a substantial portion of said transparent chips forming transparent light transmitting areas extending through the thickness of said decorative wear layer and through which said surface is visible thereby creating a three dimensional effect, said chips being substantially thinner than said decorative wear layer.

2. A method of producing a decorative surface covering having a wear layer with three dimensional appearance which comprises depositing a blend of about 40 to about 90 percent transparent and about 60 to about 10 percent opaque chips of resinous compositions upon a backing having a surface formed of a colored pigmented resinous composition compatible with said chips, and pressing said chips onto said surface to form a smooth decorative wear layer integrally bonded to said surface, about 5 to about 30 percent of said chips in said decorative wear layer forming transparent light transmitting areas extending through the thickness of said wear layer and through which said surface is visible to create a three dimensional effect, said chips having a thickness of about ⅙ to about ⅔ the thickness of said decorative wear layer.

3. The method according to claim 2 wherein said transparent and opaque chips of resinous compositions are vinyl chloride polymer compositions.

4. A method of producing a decorative surface covering having a wear layer with three dimensional appearance which comprises forming a thin colored pigmented resinous composition layer upon the surface of a backing, depositing upon said pigmented layer a blend of transparent and opaque chips of resinous compositions compatible with said pigmented resinous composition, said blend comprising about 40 to about 90 percent transparent chips and about 60 to about 10 percent opaque chips and pressing said chips onto said pigmented layer to form a smooth decorative wear layer having a thickness of about 0.015 to about 0.050 inch integrally bonded to said pigmented layer, about 5 to about 30 percent of said chips in said decorative wear layer forming transparent light transmitting areas extending completely through the thickness of said wear layer through which said pigmented layer is visible to create a three dimensional effect, said chips having a thickness of about ⅙ to about ⅔ the thickness of said decorative wear layer.

5. A method of producing a decorative surface covering having a wear layer with three dimensional appearance which comprises forming a thin colored pigmented resinous composition layer upon the surface of a backing, forming a blend of about 40 to about 90 percent transparent and about 60 to about 10 percent opaque chips of resinous composition compatible with said pigmented resinous composition layer comprising, sheeting said blend to form a sheet having pigmented opaque areas and transparent light transmitting areas extending through the thickness of said sheet, cutting said sheet into chips, depositing said chips upon said pigmented layer and pressing said deposited chips to form a smooth decorative wear layer having a thickness of about 0.015 to about 0.050 inch integrally bonded to said pigmented layer, about 5 to about 30 percent of the surface of said decorative wear layer presenting transparent light transmitting areas through which said pigmented layer is visible to create a three dimensional effect, said chips having a thickness of ¼ to ½ the thickness of said decorative wear layer.

6. The method according to claim 5 wherein said transparent and opaque resinous compositions and said pigmented resinous composition are vinyl chloride polymer compositions.

7. A method of producing a decorative surface covering having a wear layer with three dimensional appearance which comprises coating a surface of a felted fibrous backing with a pigmented thermoplastic resinous composition comprising thermoplastic resinous binder, pigment and filler dispersed in a volatile dispersion medium, heating said coated surface to a temperature sufficient to dry said composition thereby forming a pigmented layer upon said surface, depositing upon said pigmented layer a blend of about 40 to about 90 percent transparent and about 60 to about 10 percent opaque chips of thermoplastic resinous compositions compatible with said pigmented composition and pressing said chips onto said pigmented layer to form a smooth decorative wear layer integrally bonded to said pigmented layer, about 5 to about 30 percent of said decorative wear layer being formed of transparent light transmitting areas extending completely through the thickness thereof through which said pigmented layer is visible to create a three dimensional effect, said chips having a thickness of about ⅙ to about ⅔ the thickness of said decorative wear layer.

8. A method of producing a decorative surface covering having a wear layer with three dimensional appearance which comprises forming a transparent resinous composition sheet, cutting said transparent sheet into transparent chips, forming an opaque resinous composition sheet, said opaque resinous composition being compatible with said transparent resinous composition, cutting said opaque sheet into opaque chips, preparing a blend of about 40 to about 90 percent of said transparent chips and about 60 to about 10 percent of said opaque chips by weight, sheeting said blend to produce a sheet having opaque areas and transparent light transmitting areas extending therethrough, cutting the sheet formed from said blend into chips, forming a thin pigmented resinous composition layer upon a surface of a backing, said pigmented composition used to form said pigmented layer being compatible with said opaque resinous composition and said transparent resinous composition, depositing the chips cut from the sheet formed from said blend upon said pigmented layer and pressing said chips thereon to form a smooth decorative wear layer having a thickness of about 0.015 to about 0.050 inch integrally bonded to said pigmented layer, about 5 to about 30 percent of the surface of said decorative wear layer presenting transparent light transmitting paths through which said pigmented layer is visible to create a three dimensional effect, said chips cut from the sheet formed from said blend having a thickness of about ⅙ to about ⅔ the thickness of said decorative wear layer.

9. A method of producing a decorative surface covering having a wear layer with three dimensional appearance which comprises coating a transparent resinous composition selected from the group consisting of plastisols and organosols of vinyl chloride polymer upon a base as a uniform coating thereon, heating said coating to fuse said transparent resinous composition to form a clear sheet, cutting said transparent sheet into clear chips, coating opaque resinous composition selected from the group consisting of plastisols and organosols of vinyl chloride polymer upon a base as a uniform coating thereon, heating said coating to fuse said opaque resinous composition to form an opaque sheet, cutting said opaque sheet into opaque chips, preparing a blend of about 40 to about 90 percent of said transparent chips and about 60 to about 10 percent of said opaque chips by weight, sheeting said blend to produce a sheet having opaque areas and transparent light transmitting areas extending therethrough, cutting the sheet formed from said blend into chips, forming a thin pigmented resinous composition layer upon a surface of a backing, said pigmented composition used to form said pigmented layer being compatible with said pigmented opaque composition and said transparent resinous composition, depositing said chips cut from the sheet formed from said blend upon said pigmented layer and pressing said chips thereon to form a smooth decorative wear layer having a thickness of about 0.015 to about 0.050 inch integrally bonded to said pigmented layer, about 5 to about 30 percent of the surface of said decorative wear layer presenting transparent light transmitting paths through which said pigmented layer is visible to create a three dimensional effect, said chips cut from the sheet formed from said blend having a thickness of about 1/6 to about 2/3 the thickness of said decorative wear layer.

10. Decorative sheet material useful as a surface covering having a wear layer with a three dimensional appearance which comprises a backing, a colored pigmented resinous composition layer bonded to one surface of said backing and integrally bonded to said pigmented layer a smooth decorative resinous composition wear layer having a thickness of about 0.015 to about 0.050 inch, the resinous compositions of said pigmented layer and said wear layer being mutually compatible, said decorative wear layer being formed of pigmented opaque areas and transparent areas, said opaque areas being randomly disposed throughout the thickness of said decorative layer and separated by said transparent areas, about 5 to about 30 percent of said pigmented layer being completely visible from the surface of said wear layer through randomly disposed, irregular transparent areas which extend completely through said wear layer thereby creating a three dimensional effect.

11. A decorative surface covering according to claim 10 wherein said backing is a sheet of felted fibrous material.

12. A decorative surface covering according to claim 10 wherein said compositions are vinyl resin compositions.

13. Decorative sheet material useful as a surface covering having a wear layer with a three dimensional appearance which comprises a fibrous backing, a colored pigmented vinyl chloride resin composition coating bonded to one surface of said backing and integrally bonded to said pigmented coating a smooth decorative vinyl chloride resin composition wear layer having a thickness of about 0.015 to about 0.050 inch, said decorative layer being formed throughout of pigmented opaque areas randomly disposed throughout the thickness of said decorative layer separated by transparent areas, about 5 to about 30 percent of said coating being visible from the surface of said wear layer through randomly disposed, irregular transparent areas which extend completely through said wear layer.

14. Decorative sheet material useful as a surface covering having a smooth wear layer with a three dimensional appearance which comprises a backing, a colored pigmented resinous composition layer bonded to one surface of said backing and integrally bonded to said pigmented layer a smooth decorative resinous composition wear layer having a thickness of at least about 0.015 inch, the resinous composition of said pigmented layer and said wear layer being mutually compatible, said decorative layer being formed of randomly disposed pigmented opaque areas separated by transparent areas, a substantial portion of said opaque areas extending for a substantial depth into said decorative layer and a substantial portion of transparent areas being irregular and providing paths through which said pigmented layer is visible from the surface of said wear layer thereby creating a three dimensional effect.

References Cited in the file of this patent

UNITED STATES PATENTS

| | | |
|---|---|---|
| 2,104,790 | Casto | Jan. 11, 1938 |
| 2,455,777 | Jones | Dec. 7, 1948 |
| 2,775,994 | Rowe | Jan. 1, 1957 |